United States Patent Office 3,481,259
Patented Dec. 2, 1969

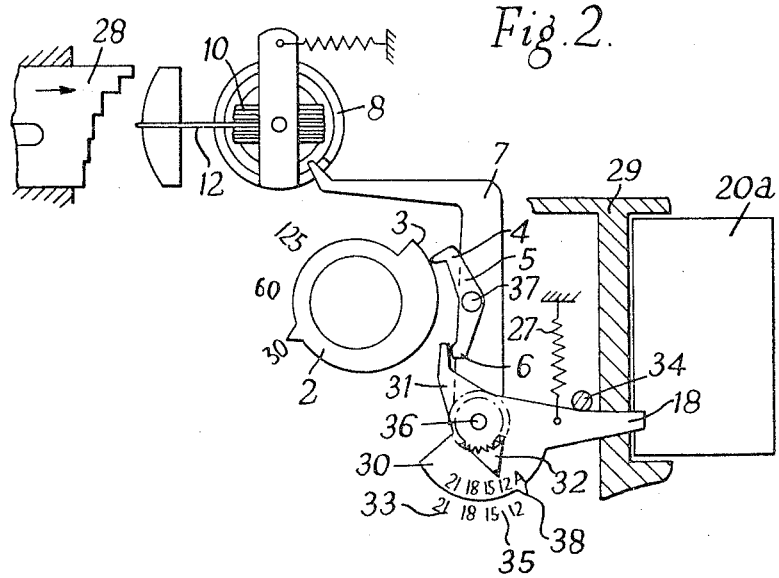
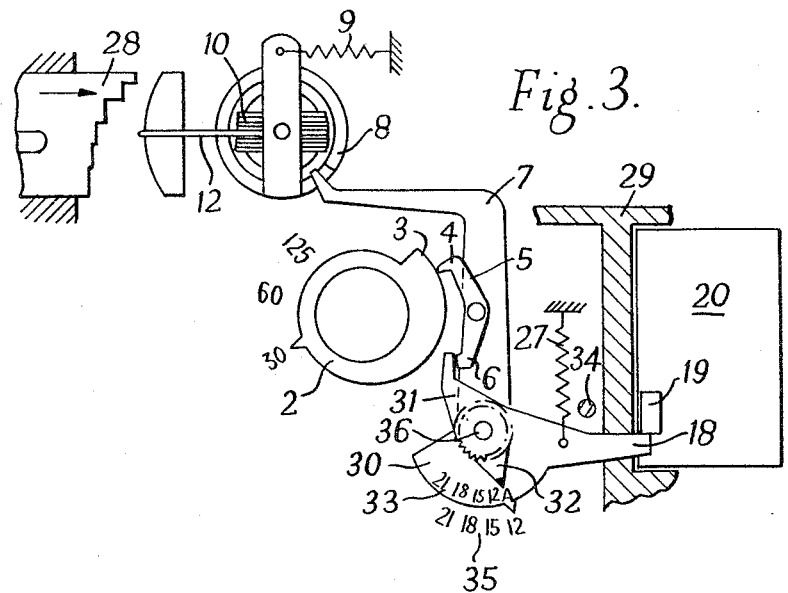

3,481,259
PHOTOGRAPHIC CAMERA WITH AUTOMATIC OR MANUAL FILM SPEED ADJUSTMENT
Kurt Langnau, Walter Hennig, Horst Strehle, and Heinz Schulze, Dresden, Germany, assignors to VEB Pentacon Dresden Kamera- und Kinowerke, Dresden, Germany
Filed Mar. 14, 1966, Ser. No. 534,074
Int. Cl. G01j 1/00, 1/52; G03b 19/04
U.S. Cl. 95—10
7 Claims

ABSTRACT OF THE DISCLOSURE

The camera is provided with a scanning device which engages a setting member provided on the film cassette at a position predetermined by the manufacturer according to the sensitivity of the film in the cassette. To enable the exposure meter device in the camera to be set in the appropriate manner in the event that either no setting element is present on the cassette or that the film used has a speed not corresponding to the position of the existing setting element a control element is provided by which manual adjustment of the scanning device and hence the exposure meter can be effected.

---

The invention relates to a photographic or cinematographic camera having a built-in photo-electric exposure meter, coupled with a device for the scanning of lugs, recesses etc. which represent different film speeds or exposure factors dependent thereon and which are provided in insertable cassettes or films.

Known cameras of this kind are subject to the drawback that they can only be used for cassettes or films of the type provided with lugs or recesses of the code system for which the scanning device on the camera as designed. Cassettes or films available on the market and not provided with lugs or recesses in accordance with this code system, or lacking lugs and recesses altogether, are therefore, unusable with such cameras. The same applies to cassettes which, despite any lugs which may be provided, have been subsequently loaded with some type of film selected at random. There is, of course, a known type of cassette with an adjustable lug enabling the camera to be set for the film sensitivity in question, but in this case likewise the use of a camera of the aforementioned kind necessitates recourse to a special cassette characterized by adjustable lugs.

An object of the invention is to provide a scanning device on the camera, enabling the film speed, or exposure factors such as filter numbers dependent thereon, to be set automatically or manually, as desired.

The details of the invention may be seen from the examples illustrated and described, which are equipped with devices for setting different film speeds.

In the drawings:

FIGURE 2 shows a further exposure factor setting arrangement in a camera for receiving a cassette with or without a setting abutment in the case of a cassette without a setting abutment in which manual setting of the speed sensitivity is carried out;

FIGURE 3 shows the arrangement in accordance with FIGURE 2, in the case of a cassette with a setting abutment when the film speed is set automatically;

Figure 1:
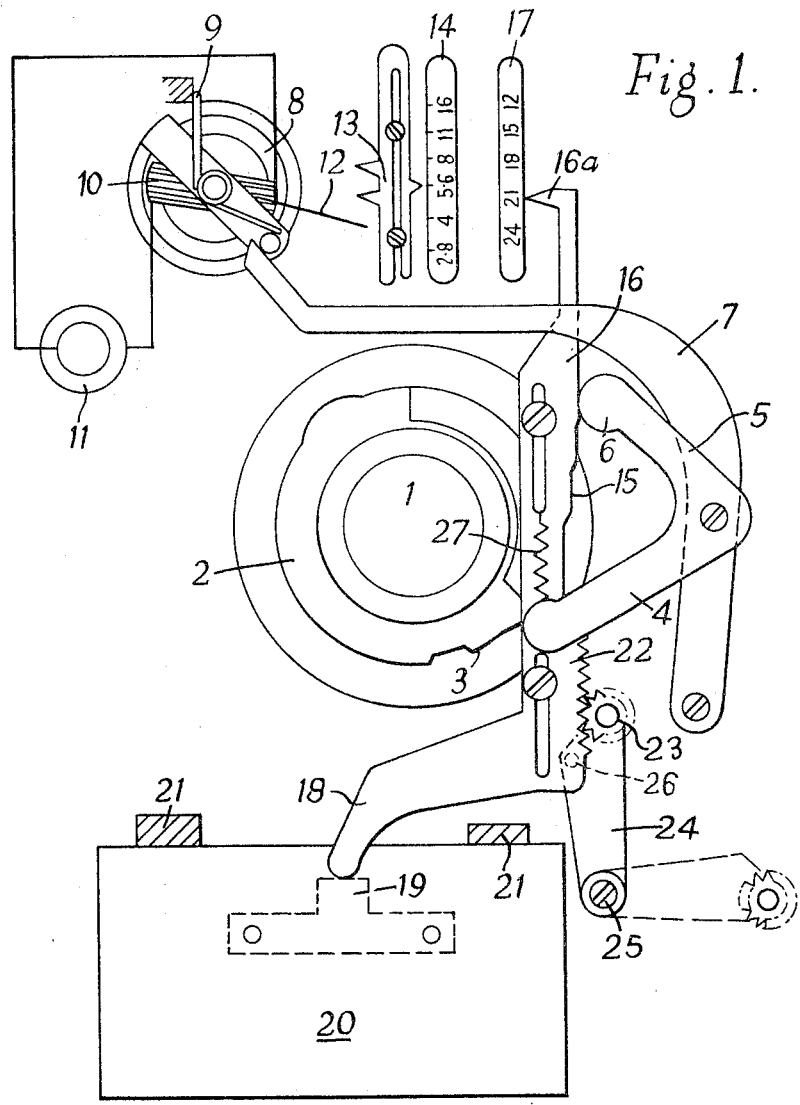
FIGURE 1 shows an exposure factor setting arrangement in a camera capable of accommodating a film cassette with or without a setting abutment, and in which the aperture and exposure time, film speed and aperture diaphragm setting are set manually in case of a cassette without a setting abutment.

In a housing of a camera, this housing not being shown separately, the time setting ring 2, which is formed with a cam 3, is rotatably mounted around the exposure aperture 1 (cf. FIGURE 1). The arm 4 of the bell-crank lever 5, which is mounted on a summation lever 7, presses against the cam 3. The summation lever 7 is operatively connected with a rotatably mounted measuring mechanism 8. The measuring mechanism 8 is subjected to the action of an adjusting spring 9 which tends to rotate the summation lever 7 in an anti-clockwise direction. The moving coil of the measuring mechanism 8 is conductively connected, in the known manner with a photo-electric cell 11. The pointer 12 affixed to the moving coil 10 oscillates opposite a mark 13 which can be adjusted in accordance with an aperture diaphragm scale 14.

There is also a scanning slide 16 which is loaded by a spring 27 and on a cam 15 of which the arm 6 of the bell-crank lever 5 rests and of which an indicator 16a is situated opposite a scale 17 with values for the film speeds. The scanning arm 18 of the scanning slide 16 is situated in the path of a setting abutment 19, which may be provided on an insertable cassette 20. The position of a cassette 20 is determined by stops 21 provided on the camera. The scanning slide 16 is provided with a toothed rack 22, engaged by a toothed wheel 23 rotatably mounted on a control lever 24. The control lever 24 is pivotably mounted on a pivot pin 25 and provided with a clamp lug 26 which frictionally engages the control slide 16 to hold the latter in its set position.

The arrangement operates as follows:

When use is made of a cassette equipped with an adjusting lug 19, the control lever 24 is in the position shown by the broken line. The abutment 19 on the cassette 20 then pushes the scanning slide 16 so as to adjust the measuring mechanism acording to the film speed.

If a casette 20 having no setting abutment 19 is inserted, the control lever 24 is pivoted anticlockwise into the position shown in full line. The wheel 23 then engages the teeth 22 on the scanning slide 16. At the same time the clamp lug 26 presses against the scanning slide 16, so that between the clamp lug 26 and the scanning slide 16 a friction operating locking action is sufficient to overcome the force of the spring 27. By rotating the wheel the scanning slide 16 can be set to any desired position in accordance with the scale 17. The cam 15 slides along the arm 6 of the bell-crank lever 5, and this movement results, via the summation lever 7, in a rotation of the measuring mechanism 8. The measuring mechanism 8 is thus adjusted in accordance with the speed of the film inserted.

In order to set the correct exposure time, the time setting ring 2 is now rotated until the cam 3, via the double lever 5 and the summation lever 7, has moved the measuring mechanism 8 into a position in which the pointer 12 is situated opposite the mark 13.

In the arrangement shown in FIGURES 2 and 3 the time setting ring 2, which carries a cam 3, is situated in a housing 29 of a camera, only part of the housing being illustrated. The arm 4 of the bell-crank lever 5, which is rotatably mounted on the pin 37 carried by the summation lever 7, presses against the cam 3. The summation lever 7 is operatively connected with the rotatably mounted measuring mechanism 8. The measuring mechanism 8 is subject to the action of an adjusting spring 9, which tends to rotate the summation lever 7 in an anti-clockwise direction around the bearing pin 36. The moving coil 10 of the measuring mechanism 8 is conductively connected in a known manner, with a photoelectric cell (not shown). The pointer 12 affixed to the moving coil 10 oscillates oppoiste a "stepped" sensing slide 28, which is coupled, in the known manner with a lens discharge (not shown) and which moves towards the pointer 12 in the direction shown by the arrow on release of the camera shutter.

A scanning lever 30 is also provided, which is loaded by a spring 27 and which, with a setting element 31 is friction coupled. The scanning lever 30 and the setting element 31 are rotatably mounted on the bearing pin 36 for the summation lever 7. The spring 27 tends to draw the scanning lever 30 against a rigid stop 34 provided on a fixed part of the camera. The arm 6 of the bell-crank lever 5 presses against the setting element 31. On the scanning lever 30, and opposite the pointer 32 of the setting element 31, there is a scale 33 which, in addition to the mark A, shows several values for different film speed. The scanning arm 18 of the scanning lever 30 is situated in the path of a setting abutment 19, which may be provided on a cassette 20.

The apparatus functions as follows:

If a cassette 20a (cf. FIGURE 2) having no setting abutment 19 is inserted, then the spring 27 causes the scanning lever 30 to come to rest against the rigid stop 34. To enable the speed of film inserted in the cassette 20a, to be taken into account the setting element 31 is rotated by hand in relation to the scanning lever 30, whilst overcoming the frictional coupling, until the pointer 32 is situated opposite that value on the scale 33 which corresponds to the speed of film inserted. The setting element 31 presses against the arm 6 of the bell-crank lever 5, which rests by its other arm 4 against the cam 3 and which, via the pin 37, pivots the summation lever 7 about the bearing pin 36. In this way the measuring mechanism 8 is rotated into a position corresponding to the selected exposure time and to the speed of the film inserted.

If a cassette 20 (cf. FIGURE 3) having an abutment 19 is inserted, the film sensitivity can be set automatically. In this case the mark 32 is first placed opposite the symbol A. The adjusting element 31 follows the movement of the scanning arm 18 by reason of the frictional coupling which arm is lifted off the stop 34 by the setting abutment 19.

Figure 4:
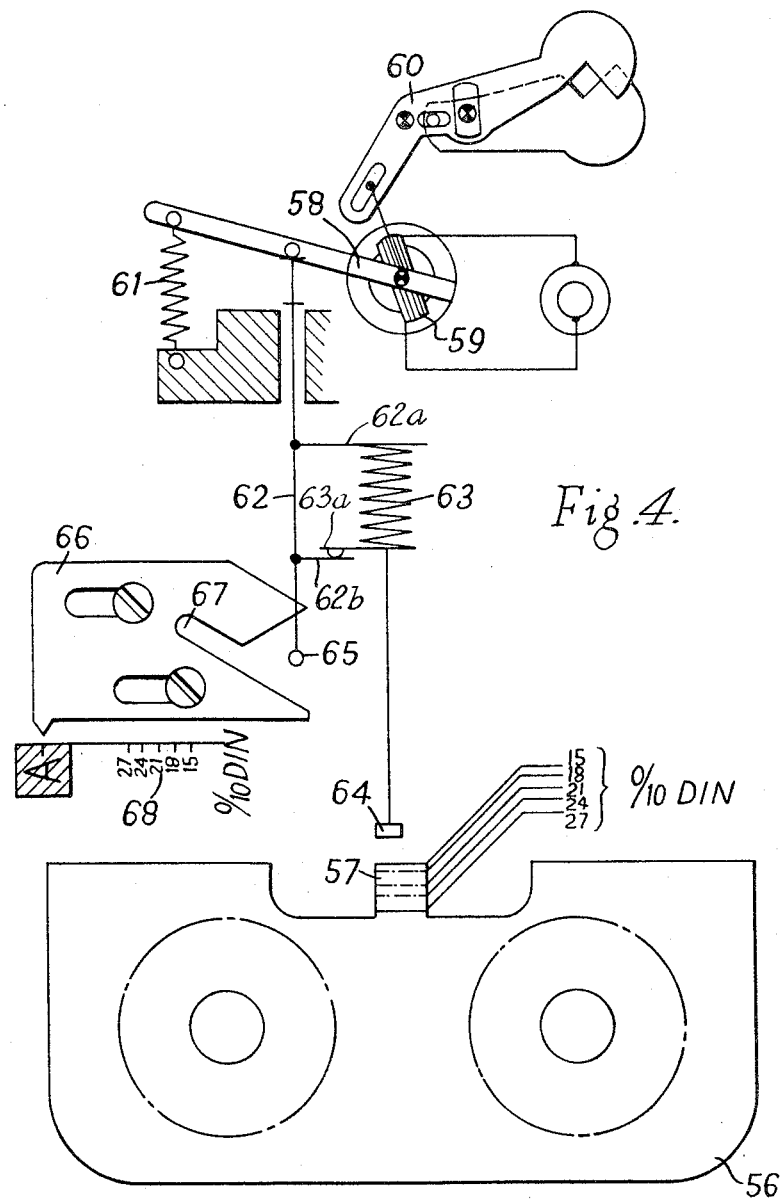
FIGURE 4 shows another cinematographic camera having an arrangement for the scanning of cassette lugs corresponding to different film speeds and which can be switched over to manual operation.

In the device shown in FIGURE 4 different film speed values are automatically selected by means of lugs 57 constructed in accordance with the speed of the film inserted in the cassette 56. The diaphragm 60 is operatively connected with the moving coil 59 of the measuring mechanism 58, which is rotatable in its entirety. The coupling spring 61 tends to rotate the measuring mechanism 58 in an anti-clockwise direction and thus produces a constant connection with a control rod 62. The control rod 62 is coupled with the scanning device 64, via the pressure spring 63, one end of which bears against an abutment 62a extending from the control element 62 and the other end of which carries both a stop member 63a bearing against a further abutment 62b extending from the control element 62 and the scanning device 64. The pressure spring 63 is stronger than the coupling spring 61. In the region of the adjusting pin 65 of the control rod 62 there is a changeover switch 66 which is displaceable at right angles to the direction of movement of the control rod 62, is provided with an oblique slit 67 and is adjustable in accordance with a scale 68. This scale shows values for film speeds and a mark A (automatic selection of film speed).

If a cassette 56 which is provided with a lug 57 is to be inserted into the camera having the features shown, then the changeover switch 66 is first set to the mark A of the scale 68. The lug 57 presses against the scanning device 64, which, via the pressure spring 63, takes the control element 62 along with it rotating the measuring mechanism 58 in opposition of the coupling spring 61. If a cassette which has no lug 57 or having a lug 57 not corresponding to the speed of the film inserted in the cassette 56, the system can be switched over to manual film speed selection. For this purpose the changeover switch 66, secured against accidental automatic displacement, is moved away from the mark A to that value on the scale 68 which corresponds to the speed of film being used. In this process the slit 67 of the changeover switch engages the adjusting pin 65 and pushes the control rod 62, regardless of the position of the scanning device 64, so that the measuring mechanism is rotated solely in accordance with the film speed to which the apparatus has been set manually. If there are any projections on the cassette, these cannot nullify the manual adjusting system, since any movement of the scanning device 64, will be taken up by the spring 63.

The invention permits of numerous further variations. For example, the changeover switch for nullifying the automatic adjustment and the adjusting element for enabling different filter factors or film sensitivities to be taken into account by manual means can be provided separately from each other.

We claim:

1. In a camera having a housing, photo-electric exposure meter including a moving coil device arranged in said housing by which the exposure of the film is controlled, the provision of (a) a scanning device movable within said housing and engageable with a setting element provided on the film carrier loaded in the camera, said setting element being arranged at a predetermined position according to the speed of the film in the carrier, (b) a spring urging said scanning device in one direction, (c) means operatively coupling said scanning device with the moving coil device whereby movement of the scanning device results in adjustment of the moving coil device, and (d) a control element mounted in said housing capable of being coupled with the scanning device for manual adjustment thereof to any desired position in opposition to said spring in the event that no appropriate setting element is present on the film carrier.

2. A camera according to claim 1, including a cam ring rotatably mounted on the camera housing whereby an exposure factor can be set, and a cam element on said scanning device, wherein said means operatively coupling said scanning device with the moving coil device comprises a summation lever pivotally mounted at one end of the housing, the other end engaging the moving coil device, and a two armed lever pivotally mounted on said summation lever between the ends thereof, said two armed lever being arranged with the arm in engagement with the cam ring and the other arm in engagement with the cam on said scanning member, said scanning member being movable manually for the purpose of setting the film speed exposure factor, normally set by the setting element, when there is no setting element present on the film carrier, said summation lever being movable in accordance with two exposure factors giving a resultant movement influencing the moving coil device.

3. A camera as claimed in claim 1, wherein said control element is in the form of an adjustable slide member, and said means operatively coupling said scanning device with the moving coil device comprises a control rod coupled with the moving coil device, two spaced apart abutments on said control rod, a spring having one end bearing against one abutment and the other end bearing against the other abutment and carrying the scanning device, and a pin on said control rod engageable by said adjustable slide member during setting of the axial position of the control rod in the absence of a setting member on the film carrier.

4. A camera as claimed in claim 1, having a scale film speed on said housing in relation to which said scanning device is adjustable, and an indicator on said scanning device in juxtaposition with said scale to indicate the speed of the film.

5. A camera as claimed in claim 4 wherein said indicator and said scanning device are formed integrally as a sliding unit, one end of which serving as the indicator and the other end as an abutment engageable with the setting element.

6. A camera as claimed in claim 4 wherein said control element comprises an arm pivotally mounted on the housing, and a toothed gear wheel rotatably mounted at the end of said arm, said scanning device having a toothed rack engageable by said gear wheel.

7. A camera as claimed in claim 6, wherein a clamp device is provided on the arm of said control element, said clamp device being engageable with said scanning device when the gear wheel is in engagement with said rack for holding the scanning device in any set position against the aciton of said spring.

References Cited
UNITED STATES PATENTS

| | | | |
|---|---|---|---|
| 3,194,135 | 7/1965 | Harter et al. | 95—10 |
| 3,309,975 | 3/1967 | Kremp et al. | 95—10 |
| 3,368,467 | 2/1968 | Hahn | 95—10 |
| 3,385,185 | 5/1968 | Schulze | 95—10 |
| 3,260,182 | 7/1966 | Nerwin | 95—31 |
| 3,351,413 | 11/1967 | Kono | 352—78 |

NORTON ANSHER, Primary Examiner

JOSEPH F. PETERS, JR., Assistant Examiner

U.S. Cl. X.R.

95—31; 352—72